United States Patent [19]
Manges et al.

[11] Patent Number: 5,765,201
[45] Date of Patent: Jun. 9, 1998

[54] CHANGING PAGE SIZE IN STORAGE MEDIA OF COMPUTER SYSTEM

[75] Inventors: Mark Gregory Manges; Lynn K. Chung; Shiun Lee, all of Rochester; Arlys Jean Leitzen, Byron; Edwin Charles Grazier, Stewartville; Michael Joseph Corrigan; Mark Philip Piazza, both of Rochester, all of Minn.

[73] Assignee: International Business Machines Corporation, Armonk, N.Y.

[21] Appl. No.: 509,486

[22] Filed: Jul. 31, 1995

[51] Int. Cl.$^6$ .............................. G06F 12/02; G06F 12/10
[52] U.S. Cl. ..................... 711/201; 711/202; 711/207; 711/213
[58] Field of Search .................... 395/417, 412, 395/421.02, 421.07, 410; 711/201, 202, 207, 212

[56] References Cited

U.S. PATENT DOCUMENTS

| | | | |
|---|---|---|---|
| 5,263,140 | 11/1993 | Riordan | 395/417 |
| 5,321,827 | 6/1994 | Lu et al. | 395/500 |
| 5,465,332 | 11/1995 | Deloye et al. | 395/842 |

*Primary Examiner*—Eddie P. Chan
*Assistant Examiner*—Than V. Nguyen
*Attorney, Agent, or Firm*—Andrew J. Dillon

[57] ABSTRACT

When a computer system is upgraded, such as by adding a more advanced processor chip and/or a new operating system, a different page size may be employed. The page size is altered for data previously stored in a storage medium such as a hard disk in the computer system, without removing all of the data from the medium and rewriting it. Data is stored in the medium in blocks or sectors which have headers defining the block. Also, tables define memory objects and segments, and locate virtual memory addresses in physical memory. The headers and/or tables can be changed without rewriting all of the data in the sectors or pages in physical memory, so the page size is changed to accommodate the new system components, without excessive burden on system hardware or undue expenditure of time. In an example, in changing from a CISC processor with a 512-byte page size to a RISC system with a 4K-byte page size, the segments are changed to always be of a size of an integral multiple of 4K, and "extents" or subdivisions within a segment are changed to be multiples of 4K. Any excess space generated by these changes is zeroed. After alteration, the media (such as disks) can be accessed by either the CISC system or the new upgraded RISC system.

10 Claims, 6 Drawing Sheets

CHANGING PAGE SIZE IN STORAGE MEDIA OF COMPUTER SYSTEM

BACKGROUND OF THE INVENTION

1. Technical Field

The present invention relates to computer systems and methods of operating computer systems, and more particularly relates to improvements in methods of upgrading computer systems, involving changing the page size used for data storage in the system.

2. Description of the Related Art

Computer systems have been constructed employing microprocessor architectures based on the CISC or "Complex Instruction Set Computer" style. One example is the IBM AS/400 minicomputer. One way of upgrading these systems is to install a RISC or "Reduced Instruction Set Computer" processor chip and its associated operating system. In this example the page sizes used in the memory access and memory management schemes are different. The CISC process has a page size of 512-bytes, whereas the RISC processor has a page size of 4096-bytes. In a system upgrade, the customer ordinarily would have been using the system for a long period, perhaps several years, and so there would be in existence a large volume of data stored in permanent storage, which the customer would wish to preserve, and to use in the ongoing business. The storage allocation scheme used between the two architectures would have required an unload/reload of the system to move from the CISC processor to the upgraded RISC processor. The reload step can be a very time-consuming endeavor for the customer.

It would be much more preferable if the customer's data was able to remain on media (disk units) of the CISC system and enable the media to be readable on the RISC system.

SUMMARY OF THE INVENTION

It is therefore an objective of the invention to provide an improved method of upgrading a computer system wherein permanent storage media such as disk storage can be altered without reading out all of the contents to temporary storage and rewriting it.

Another objective is to provide a method of changing the page size for data already stored in storage media such as disks in a computer system, with minimal need for rewriting the data.

The above as well as additional objects, features, and advantages of the present invention will become apparent in the following detailed written description.

According to one embodiment of the invention, when a computer system is upgraded, such as by adding a more advanced processor chip and/or a new operating system, a different page size may be employed. The page size is altered for data previously stored in a storage medium such as a hard disk in the computer system, without removing all of the data from the medium and rewriting it. Data is stored in the medium in blocks or sectors which have headers defining the block. Also, tables define memory objects and segments, and locate virtual memory addresses in physical memory. The headers and/or tables can be changed without rewriting all of the data in the sectors or pages in physical memory, so the page size is changed to accommodate the new system components, without excessive burden on system hardware or undue expenditure of time. In an example, in changing from a CISC processor with a 512-byte page size to a RISC system with a 4K-byte page size, the segments are changed to always be of a size of an integral multiple of 4K, and "extents" or subdivisions within a segment are changed to be multiples of 4K. Any excess space generated by these changes is zeroed. After alteration, the media (such as disks) can be accessed by either the CISC system or the new upgraded RISC system.

DESCRIPTION OF THE FIGURES

The novel features believed characteristic of the invention are set forth in the appended claims. The invention itself however, as well as a preferred mode of use, further objectives and advantages thereof, will best be understood by reference to the following detailed description of an illustrative embodiment, when read in conjunction with the accompanying drawings, wherein:

DESCRIPTION OF A PREFERRED EMBODIMENT

Figure 1:
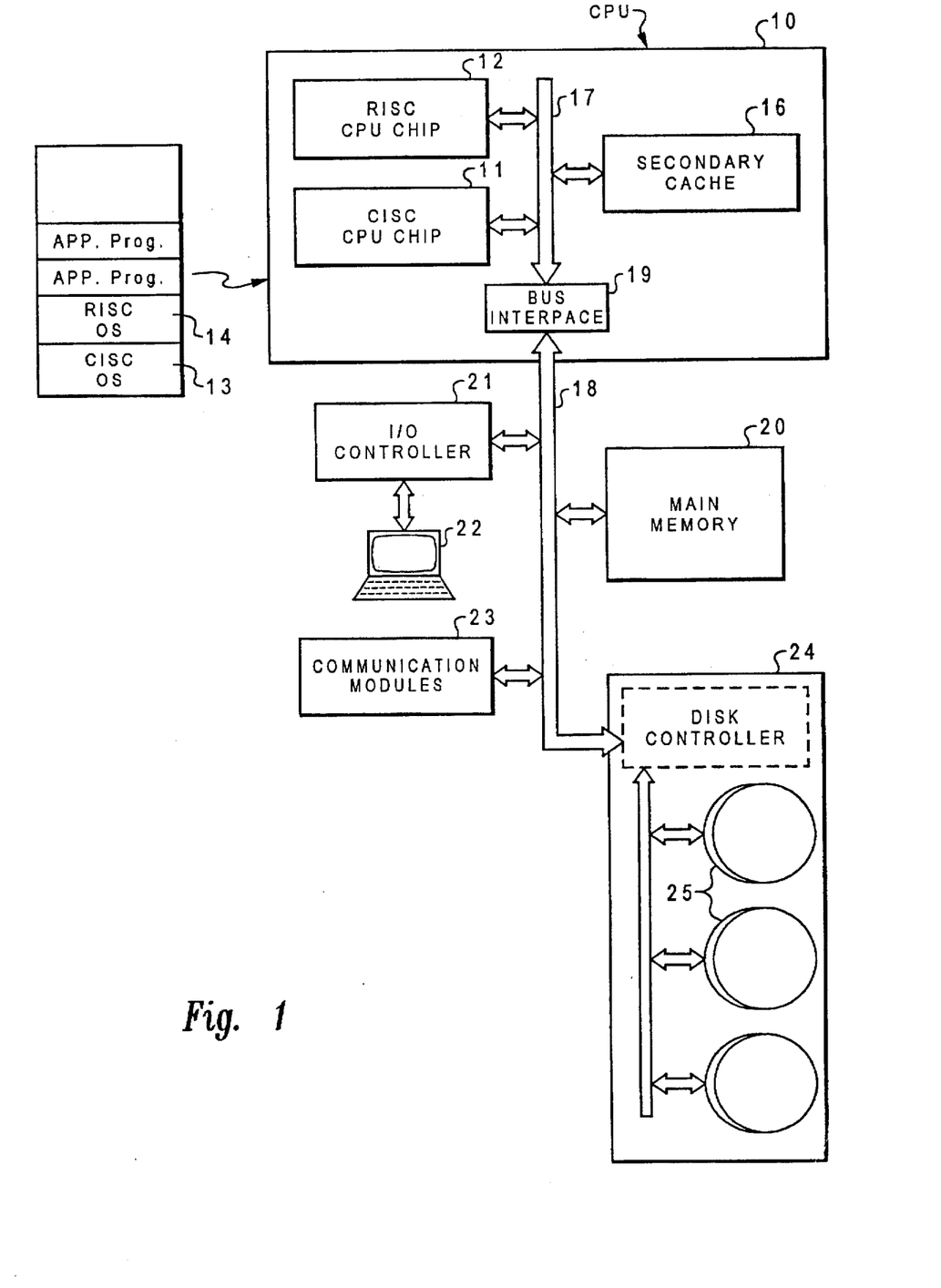
FIG. 1 is a functional block diagram of a computer system which is upgraded according to an embodiment of the invention.

Referring to FIG. 1, one embodiment of a computer system is illustrated which may employ the update method of the invention. This system has a CPU 10 having a microprocessor chip 11 of the CISC type. The system is upgraded by adding a higher-performance microprocessor such as a RISC chip 12. The RISC chip 12 usually replaces the CISC chip. That is, another board is added, or an upgrade socket is provided so both microprocessor chips are in place but only one is active and in control at any given time. After the system is up and running with the upgrade chip 12, the old chip is no longer ever used, so it is immaterial whether it stays in place or not. A CISC operating system is executed on the CISC chip before the upgrade, and a RISC operating system 14 is added on top of the old operating system, for the upgrade process. After all upgrade tasks are performed, the RISC operating system is predominate.

The processor chips 11 or 12 have the same (or compatible) outward configurations, including address and data buses and control lines, so most of the system board is not altered in the upgrade. Each would usually have an on-chip data and instruction cache (or caches). An off-chip or secondary cache 16 would usually be employed, and this would be accessed by either processor chip in the upgrade. The secondary cache 16, usually connected by a local bus 17 to the CPU 10, is usually much larger than the on-chip cache, and access to it is somewhat slower than to the on-chip caches. The local bus 17 within the processor has a number of address, data, and control buses, which would not be changed in the upgrade. The CPU is connected to a system bus 18 by a bus interface 19, so translations in timing and controls are made to the system bus standards from the local busses. A main memory 20 and various other system resources such as an I/O controller 21 for a keyboard and display console 22, various kinds of communications adapters 23, and a disk storage system 24 are usually coupled to the system bus structure. The memory is thus hierarchical from fastest to slowest, and from smallest to largest, and from most expensive (per byte), in progression from the on-chip caches with the processor chips 11 or 12, to the secondary cache 16, to the main memory 20, to the disk storage unit 24. The main memory 20 usually contains a subset of what is in the disk storage 24, the secondary cache 16 contains a subset of what is in main memory 20, and the on-chip caches contain subsets of what is in the secondary cache. The CPU can access the on-chip caches within an cycle, whereas it takes several cycles to access the secondary cache 16. If a cache miss occurs in primary and secondary caches, then the main memory 20 is accessed to do a cache fill operation, from main memory. If the main memory 20 does not contain the location for which a cache fill is attempted, then a page containing this data is accessed from disk storage 24, and the cache fill is completed and the memory access satisfied. The time required to acquire a page from disk and write it to main memory would be many thousands of CPU cycles, during which the CPU is ordinarily switched to do another task, or stalled, waiting for the data to satisfy the request.

All of the hardware of the computer system of FIG. 1 is unaffected by the upgrade, except of course the chip 11 or 12 itself. The cache 16, buses 17 and 18, main memory 20, I/O devices 21, 22, 23, and disk unit 24, all remain the same and need no alteration in structure. The volatile memory, i.e., caches and main memory, can be rewritten in a short time, because these are smaller in data content and faster in access, as well as because these are rewritten on every boot-up anyway. The hard disk system 24 is not so easily rewritten, however. The hard disk system 24 may contain several disks 25, and these may be mirrored, so there are often many hard disks, each multiple Gigabytes in size. Typically, after the system has been running for a long time, possibly years, it contains a very large amount of the user's data, in place in the hard disk system. Upon an upgrade, all of this data must of course be saved, and the system must be up and running in a short time. That is, the upgrade procedure itself represents downtime, and must be minimized, since the user's business is often hampered (or at a standstill) during computer downtime. If the data contained in the hard disks 25 had to be read out to temporary storage media, then rewritten to the hard disks, this would be expensive not only in hardware requirements (sufficient space would be needed to store all of the data from the multiple disks 25), but also in downtime for the system, as well as operator costs. Thus, according to the invention, the hard disk storage media are upgraded to be compatible with the new processor chip 12 and operating system 14, without needing to read and rewrite the entire contents. In the example, the RISC processor chip 12 and its operating system 14 are based on a page size of 4096-bytes, whereas the CISC chip 11 and its operating system are based on a page size of 512-bytes. The data on the hard disks 25 is altered with the data in place, rather than reading out all the data and writing it back, to change from the 512-byte page size to a 4096-byte page size.

Figure 2:
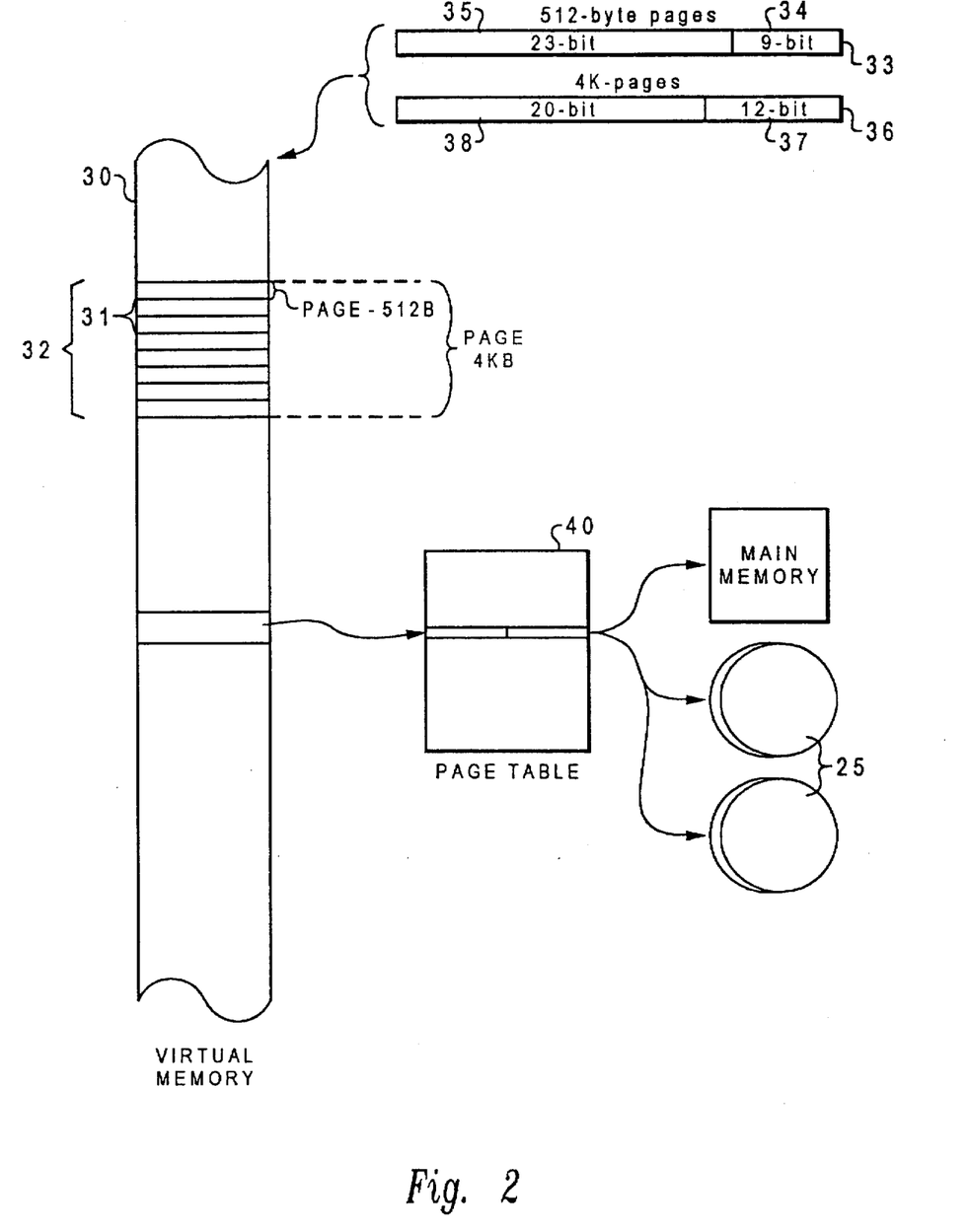
FIG. 2 is a diagram of a memory map of representing memory space for the system of FIG. 1.

Referring to FIG. 2, the virtual memory space 30 of the CISC chip 11 in this example is divided into 512-byte pages 31, whereas this same virtual memory space of the RISC processor chip 12 is divided into 4096-byte pages 32. If the virtual addresses were 32-bits in length, for example, as seen in FIG. 2 (actually, in the example of an AS/400 system given below, the address length is 48-bits) this means a 4-Gbyte virtual address space 30 would be addressed for the CISC chip by an address of format 33, having a 9-bit page offset 34 and a 23-bit page address 35. That is, the 23-bit part 35 selects one of 8 Meg (8,395,008) pages, and the offset 34 selects one byte location of 512 within a page. For the RISC chip the address would be of format 36, having a 12-bit page offset 37 and a 20-bit page address 38. That is, the 20-bit part 37 selects one of 1 Meg (1,049,376) pages, and the offset 38 selects one byte location of 4096 within a page. The page boundaries for the two addressing structures are compatible in that a page boundary for the 4096-byte pages 32 is always coincident with a page boundary for the 512-byte pages. The virtual address in memory space 30 goes through one or more translations represented in FIG. 2 by a page table 40 which contains an entry for each populated page of the memory space 30, with a pointer to the physical page number assigned to this virtual page, and an indication of whether it is located in the main memory (and thus immediately accessible), and if so which page, or in the disks 25 (and thus requiring a paging operation to move it to physical memory). In the page tables 40, or otherwise accessible in memory or from the disks, is information giving the disk number, track number, and sector where the page is physically located in the disk system. The page tables 40 are usually generated by the operating system 13 or 14 during the initial program load of the operating system, kept on disk, and upgraded as data is added or deleted. Of course, stored on disk system 25 for access during boot-up are tables giving the physical location of various, objects, segments, files or like memory structures, and from these the page tables 40 are generated by the OS.

Figure 3:
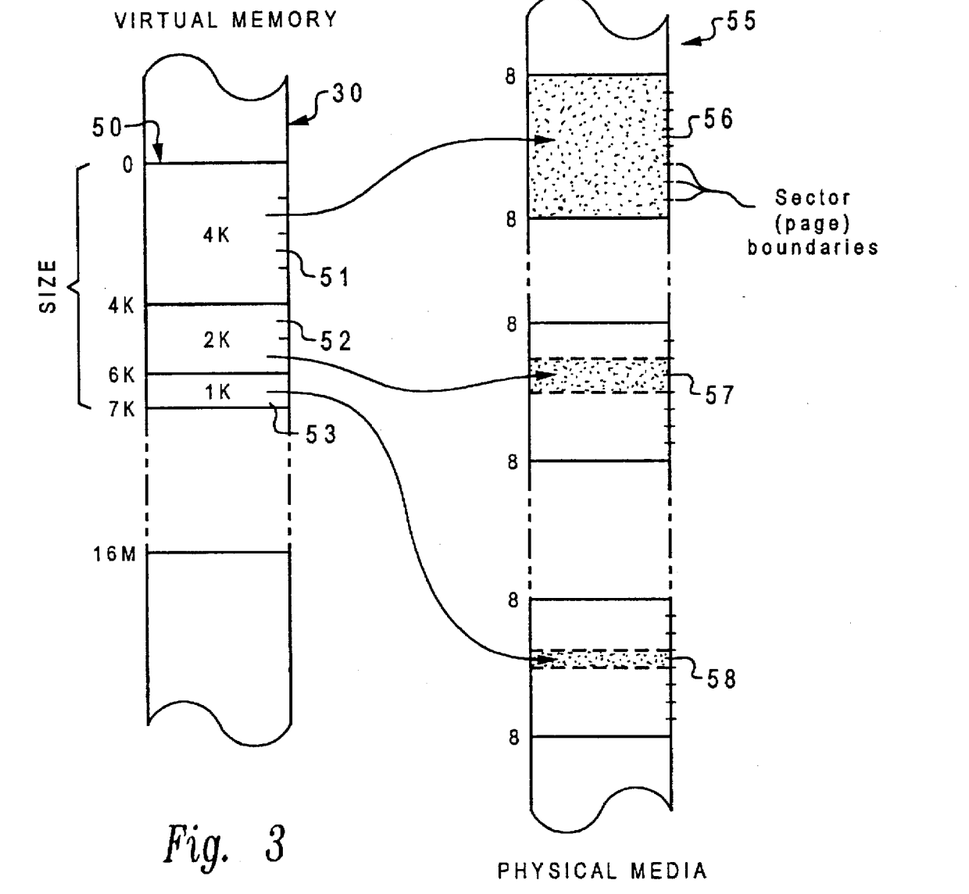
FIG. 3 is a diagram of a memory map showing how segments in virtual memory are stored in physical memory, for one example, in the system of FIGS. 1 and 2.
Figure 4:
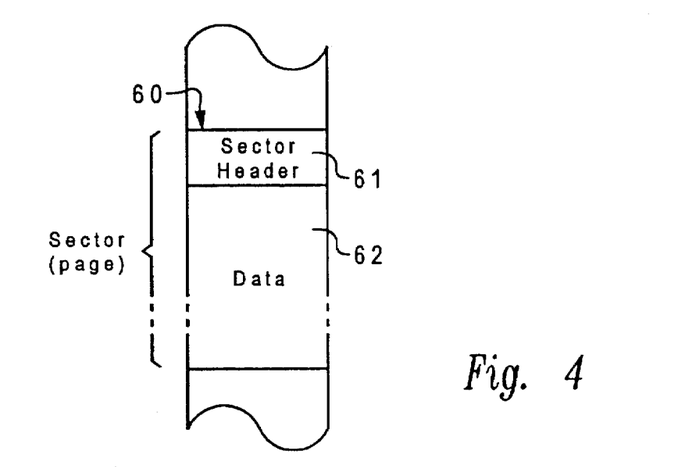
FIG. 4 is a diagram of a sector or page in the system of FIGS. 1-3.

In many virtual memory management systems, there is the provision for defining "segments," where a segment is a defined area of virtual memory space which is treated as a unit for various purposes, such as protection, assignment to a task or process, etc. In the example of the AS/400 system, a segment is defined as having a size of either 16M-byte or 64K-byte, using this much virtual memory space, with a starting address an integral multiple of its size. A 16M segment will have the last three bytes of its starting address zeros, and a 64K segment will have the last two bytes of its starting address zeros. But then the segment does not need to occupy 16M or 64K in disk memory. When a segment is created by the memory manager or OS, it is defined to have an initial "size" which can be any multiple of 512-bytes, i.e., any number of pages up to its 16M-byte or 64K-byte maximum. The size can later be extended. This defined size is usually split into "extents," where the extents need not be contiguous in disk memory. Referring to FIG. 3, a 16M segment 50 may be defined in virtual space 30 having a size of 7K-bytes, and this is split into three different "extents" for storage in disk memory (in the disks 25), a 4K extent 51, a 2K extent 52, and a 1K extent 53. In the memory space 55 defined by the disks 25, the segment 50 may be mapped into three discontiguous spaces including a 4K space 56 for the extent 51, a 2K space 57 for the extent 52, and a 1K space 58 for the extent 53 (eight, four, and two 512-byte sectors). The media which defines the space 55 is divided into eight sector (page) boundaries 59, where each sector (or page) is as seen in FIG. 4, where there is a block 60 of 512-bytes of data (in the system set up by processor 11 and operating system 13) along with an 8-byte sector header 61 which includes information such as segment number. Stored tables correlate sector number with segment numbers, page numbers, etc. Note that the space 55 is shown as contiguous, but it could be on separate physical disk drives. That is, the storage management system may only in non-contiguous spaces but 50 not only in non-contiguous spaces but also on different physical devices. An extent is a set of contiguous 512-byte sectors (pages) on a disk storage device, where the number of sectors in an extent is always a power of 2, so an extent could be a little as one sector or as much as 2exp15 or 32K sectors (16M-byte).

According to the invention, to accommodate the new processor 12 and the new operating system, there is no change in the sector size of 512-bytes on the storage medium (disks) 25. The segment size is changed to always be in multiples of 4K-bytes. Segments that are increased in size will need to have the new space zeroed.

Figure 5:
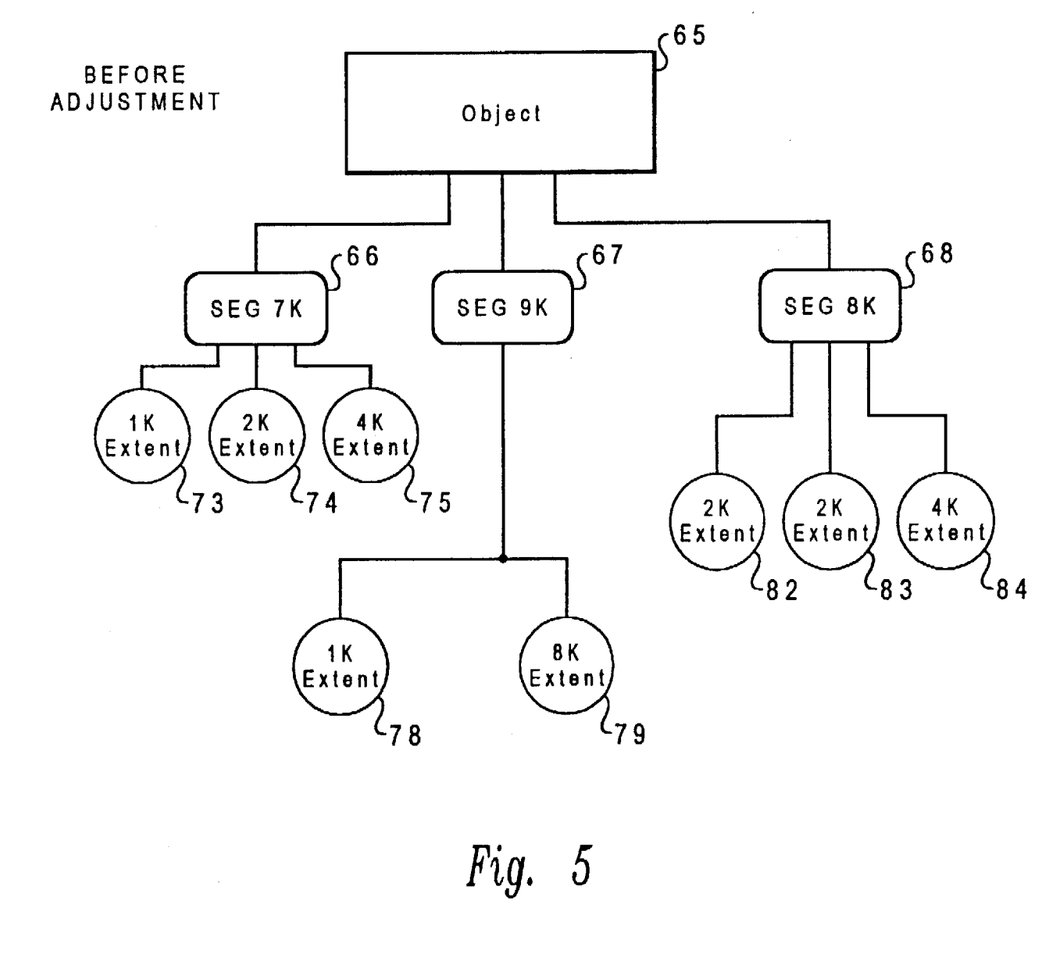
FIG. 5 is a diagram in the form of a memory map showing how an object, its segments and extents are mapped before upgrade or adjustment, for the system of FIGS. 1-4.
Figure 6:
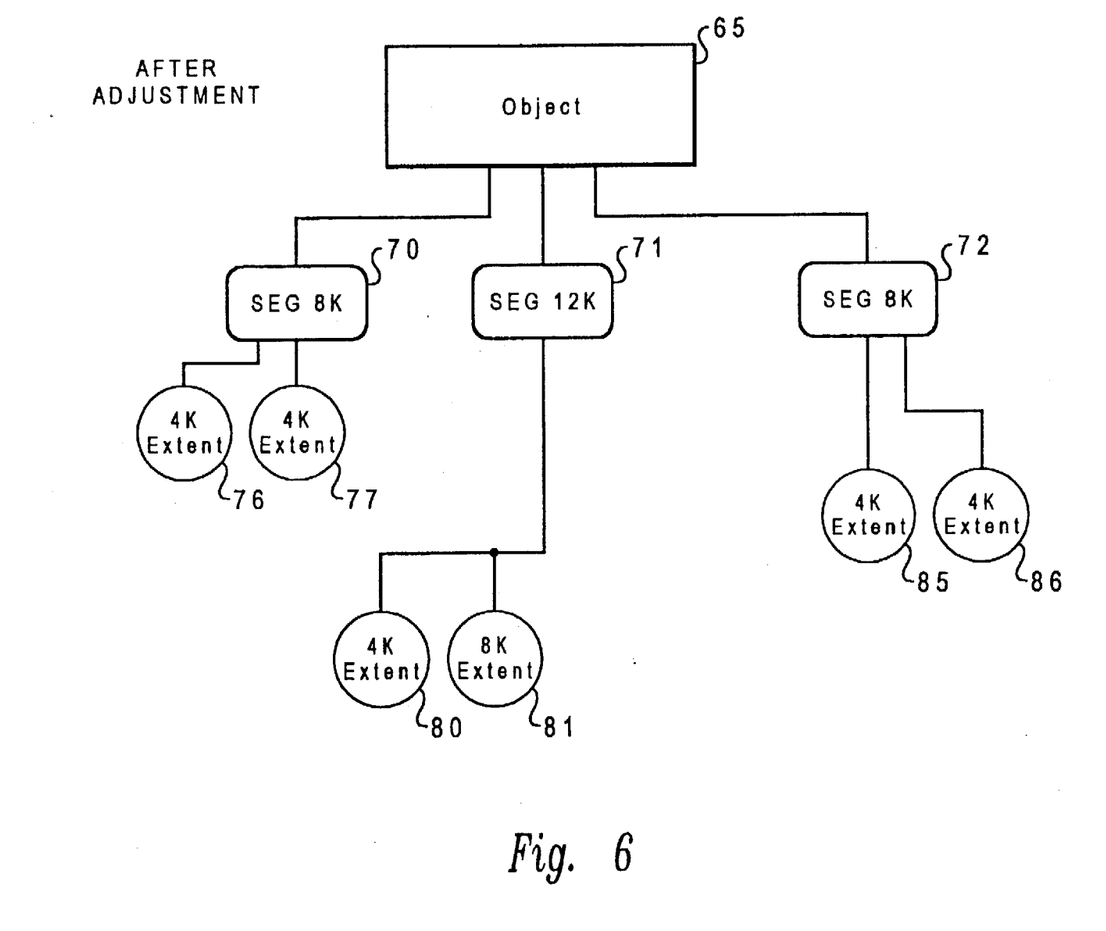
FIG. 6 is a diagram in the form of a memory map like FIG. 6, showing how the same object, its segments and extents, are mapped after upgrade or adjustment.

Each segment whose size is not a multiple of 4K will be increased to the nearest 4K multiple. For example, a 3K segment before adjustment will be a 4K segment after adjustment. A memory object 85 as seen in FIG. 5 having three segments 66, 67, and 68, of 7K, 9K, and 8k, has a total object size of 24K before adjustment and 28K after the adjustment according to the invention has taken place, as illustrated in FIG. 6. The adjusted object will have segments 70, 71, and 72, of 8K, 12K, and 8K, respectively. The three extents of 1K, 2K and 4K for segment 66 of FIG. 5 are adjusted to two 4K extents 76 and 77 of FIG. 6. Likewise, the 1K and 8K extents 78 and 79 in the 9K segment 67 of FIG. 5 are changed to 4K and 8K extents 80 and 81 of FIG. 6. Similarly, the three extents 82, 83 and 84 of 2K, 2K and 4K in the 8K segment 68 of FIG. 5 are changed to two 4K extents 85 and 86 of FIG. 6.

Figure 7:
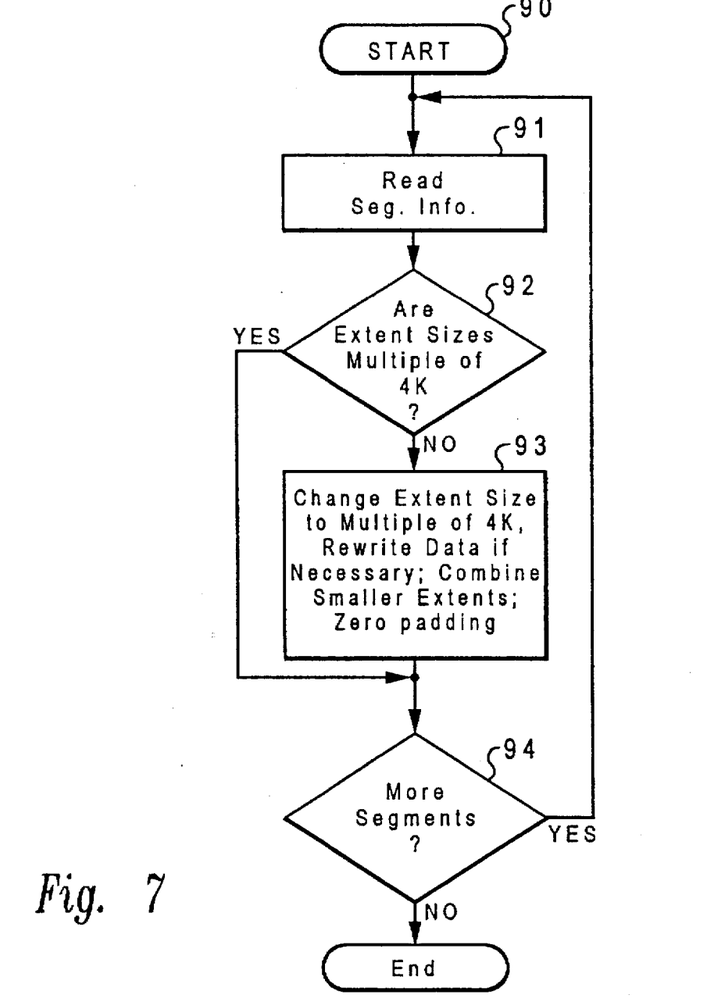
FIG. 7 is a logic flow chart of the process for upgrading and changing page size according to one embodiment of the invention.

Referring to FIG. 7, a logic flow chart of the process for adjusting the page sizes is illustrated. The process starts at block 90, and first segment information is read from the segment or page tables on disk, at block 91. A segment is examined to see if the extent sizes are all integral multiples of 4K-bytes at block 92. If not, the extent size is changed to 4K at block 93, and paddinig is zeroed; data in one extent may be combined with other extents of this segment if extra space was freed. All extents are already 4K, this block 93 is skipped. This continues until all extents of a segment are examined, then the next segment is read, using the loop created by block 94, until all segments are completed.

Accordingly, for the upgrade described with regard to FIG. 1, the CISC data in media 25 is prepared on media readable by the RISC system, and then the CISC media is merged into the RISC media configuration. Once the media is part of the RISC configuration, the customer data can be read from that media as well as the new RISC operating system can be installed over the top of the CISC operating system.

The CISC media units of allocation are examined for readability by the RISC system as described above. If the allocation would not be readable by the RISC system, then the allocation unit is reallocated in a RISC-compatible readable format as described earlier. The new allocation unit is then made to resemble the original allocation unit.

This process continues until all allocation units have been examined. Once all the allocation units have been processed, the CISC media is marked as "prepared" for the merging step described below. The CISC media remains readable by the CISC system since the new allocations are based on the common denominator of allocation unit size (say 4096 bytes for example).

In the example used above, on the CISC machine, data may have four allocation units of size 512-bytes, 1024-bytes, 512-bytes and 2048-bytes, totaling a size of 4096 bytes. After this data is prepared, there will be one allocation unit (extent) of size 4096 bytes. Another example would be data with one allocation unit of size 512-bytes; after this data is prepared, there will be one allocation unit of size 4096.

Once the preparation process has begun, any new allocations are ensured to be readable by the RISC system. This way the preparation is only needed to be done once.

The CISC "prepared" media is recognized by the RISC system during the initial power on. When detected, the CISC media is merged with the RISC media, maintaining the configuration of the CISC media defined by the customer on the CISC system.

For example, if the CISC media contained three disk units 25, those three disk units would be merged with one RISC disk unit to create a 4-disk-unit configuration. Any allocation units created on the CISC system that are not needed on the RISC system are deleted during this merging freeing up this disk space for the RISC system to use.

Another example would be if the CISC media contained four mirrored disk units, then those four disk units would be merged with two RISC disk units creating a 6-unit mirrored system configuration. Again, the unneeded allocation units are freed up on the RISC system and made available to the storage allocation pool.

Now that the CISC media configuration has been revived on the RISC system, the operating system install may proceed, i.e., using a normal release upgrade method. Once the operating system install has completed, the system is available for normal operations.

While the invention has been particularly shown and described with reference to a preferred embodiment, it will be understood by those skilled in the art that various changes in form and detail may be made therein without departing from the spirit and scope of the invention.

What is claimed is:

1. A method of operating a computer system, wherein said computer system includes a first processor that utilizes a first page size, said method comprising the steps of:

storing a plurality of segments of data in pages in a storage medium within said computer system according to said first page size, wherein each of said segments includes a definition of one or more address extents;

thereafter altering a storage scheme within said storage medium in response to an addition of a second processor within said computer system, wherein said second processor utilizes a second page size, wherein said step of altering includes examining each address extent within each of said segments stored in accordance with said first page size, defining a new address extent aligned with a boundary of said second page size for any said examined address extent that is not aligned with a boundary of said second page size, and accessing said plurality of segments of data within said storage medium in accordance with said second page size.

2. A method according to claim 1, wherein said second page size is larger than said first page size.

3. A method according to claim 2, wherein said second page size is an integral multiple of said first page size.

4. A method according to claim 3, wherein said second page size is 4K-bytes and said first page size is 512-bytes.

5. A method according to claim 1, including the step of adjusting said segments to be of a size which is an integral multiple of said second page size.

6. A computer program product residing on a computer-usable medium for upgrading a computer system, wherein said computer system includes a first processor that utilizes a first page size, said computer program product comprising:

program code means for storing a plurality of segments of data in pages in a direct access storage medium within said computer system according to said first page size, wherein each of said segments includes a definition of one or more address extents;

program code means for altering a storage scheme within said storage medium in response to an addition of a second processor within said computer system, wherein said second processor utilizes a second page size, wherein said program code means for altering includes:
program code means for examining each address extent within each of said segments stored in accordance with said first page size,
program code means for defining new address extents aligned with a boundary of said second page size for any said examined address extent that is not aligned with a boundary of said second page size; and
program code means for accessing said plurality of segments of data within said storage medium in accordance with said second page size.

7. The computer program product according to claim 6, wherein said second page size is larger than said first page size.

8. The computer program product according to claim 7, wherein said second page size is an integral multiple of said first page size.

9. The computer program product according to claim 8, wherein said second page size is 4K-bytes and said first page size is 512-bytes.

10. The computer program product according to claim 6, further includes a program code means for adjusting said segments to be of a size which is an integral multiple of said second page size.

* * * * *